United States Patent [19]
Kim

[11] Patent Number: 6,115,428
[45] Date of Patent: *Sep. 5, 2000

[54] APPARATUS FOR AND METHOD OF GENERATING π-/N-SHIFTED N-DIFFERENTIAL ENCODED PHASE SHIFT KEYING MODULATION SIGNALS

[75] Inventor: Kwan-Sung Kim, Yongin, Rep. of Korea

[73] Assignee: Samsung Electronics Co., Ltd., Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/832,642

[22] Filed: Apr. 4, 1997

[30] Foreign Application Priority Data

Apr. 4, 1996 [KR] Rep. of Korea ............... 96/10242

[51] Int. Cl.$^7$ ................................ H04L 27/20
[52] U.S. Cl. ............................ 375/308; 332/103
[58] Field of Search ........................ 375/283, 308, 375/330, 331, 279, 280, 281; 332/103, 104

[56] References Cited

U.S. PATENT DOCUMENTS 5,260,673  11/1993  Pham .......................... 375/283
5,546,428   8/1996  Nam et al. ..................... 375/308

FOREIGN PATENT DOCUMENTS

| 0 388 381 | 9/1990 | European Pat. Off. ........ H04L 27/18 |
| 0584872 | 3/1994 | European Pat. Off. . |
| 28 43 493 B2 | 4/1980 | Germany ..................... H04L 27/20 |
| 39 19 530 C2 | 12/1990 | Germany ..................... H04L 27/20 |
| 2260671 | 4/1993 | United Kingdom . |
| 2276798 | 10/1994 | United Kingdom . |

*Primary Examiner*—Young T. Tse
*Attorney, Agent, or Firm*—Dilworth & Barrese

[57] ABSTRACT

An apparatus for and a method of generating a π/n-shifted n-DPSK modulation signal in a digital transfer system. Such apparatus and method are capable of determining both quadrature-phase and in-phase modulation signals from a single output value determination table. An output phase index is first determined from an output phase determination table, based on an index associated with a variation in phase occurring when serial binary data is converted into parallel data, along with a previous phase index. Based on the output phase index, a selected one of the quadrature-phase and in-phase modulation signals is determined from the output value determination table. After adjusting the output phase index, the remaining modulation signal is determined from the output value determination table. Accordingly, it is unnecessary to carry out complex calculations, such as sine function, cosine function and multiplication. In this regard, it is possible to more rapidly derive reliable modulated output signals.

6 Claims, 4 Drawing Sheets

APPARATUS FOR AND METHOD OF GENERATING π-/N-SHIFTED N-DIFFERENTIAL ENCODED PHASE SHIFT KEYING MODULATION SIGNALS

BACKGROUND OF THE INVENTION

1. Field of the Invention

The present invention relates to a digital transfer system, and more particularly to an apparatus for and a method of generating π/n-shifted n-differential encoded phase shift keying modulation signals which are used to modulate a serial string of binary data into a π/n-shifted signal.

2. Description of the Related Art

In digital communication systems, a digital signal is converted into a signal of a desired frequency band in accordance with a modulation method in order to carry out transfer of the digital signal. Such a modulation method used in digital communication systems includes an amplitude shift keying (ASK) method, wherein the amplitude of a carrier wave is modulated by a digital signal, a frequency shift keying (FSK) method, wherein the frequency of a carrier wave is modulated by a digital signal, and a phase shift keying (PSK) method, wherein the phase of a carrier wave is modulated by a digital signal. Among these modulation methods, the PSK method is the representative method for digital communication systems.

For example, in a digital communication system such as a cellular phone, a digital signal is modulated for its transfer in accordance with a π/4-shifted DPSK (differential phase shift keying) method. Developments in communication technology have resulted in a requirement for the transfer of data in an increased quantity. Due to such a requirement, the quantity of digital signals to be modulated inevitably increases. Under this condition, an apparatus for generating a π/16-shifted 16-DPSK modulation signal has been proposed.

Figure 1:
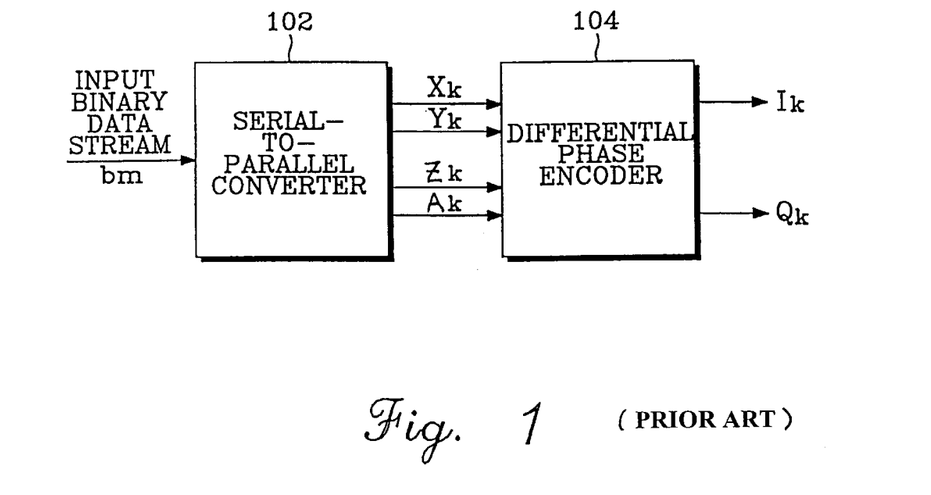
FIG. 1 is a block diagram illustrating a conventional apparatus for generating a π/16-shifted 16-DPSK modulation signal.

FIG. 1 is a block diagram illustrating a conventional apparatus for generating a π/16-shifted 16-DPSK modulation signal. As shown in FIG. 1, the apparatus includes a serial-to-parallel converter 102 adapted to convert an input binary data stream, bm, into four parallel data streams Xk, Yk, Zk and Ak. The input binary data stream, bm, is a serial data stream. By the serial-to-parallel converter 102, consecutive first, second, third and fourth bits of the input binary data stream, bm, are converted into 1-bit parallel streams Xk, Yk, Zk and Ak, respectively. That is, the serial-to-parallel converter 102 outputs a 4-bit parallel data combination. A differential phase encoder 104 is also provided which receives the 4-bit parallel data combination from the serial-to-parallel converter 102. Based on the received 4-bit parallel data combination, the differential phase encoder 104 determines a variation in phase, Δφ. The differential phase encoder 104 generates π/16-shifted 16-DPSK modulation signals Ik and Qk, based on the determined phase variation. The determination of the phase variation by the differential phase encoder 104 is carried out in accordance with a rule shown in the following Table 1. The generation of the π/16-shifted 16-DPSK modulation signals Ik and Qk is carried out in accordance with the following Equation 1.

TABLE 1

Relation Between Input Data and Variation in Phase in π/16-Shifted 16-DPSK

| Xk | Yk | Zk | Ak | Δφ |
|---|---|---|---|---|
| 0 | 0 | 0 | 0 | π/16 |
| 0 | 0 | 0 | 1 | 3π/16 |
| 0 | 0 | 1 | 0 | 5π/16 |
| 0 | 0 | 1 | 1 | 7π/16 |
| 0 | 1 | 0 | 0 | 9π/16 |
| 0 | 1 | 0 | 1 | 11π/16 |
| 0 | 1 | 1 | 0 | 13π/16 |
| 0 | 1 | 1 | 1 | 15π/16 |
| 1 | 0 | 0 | 0 | −15π/16 |
| 1 | 0 | 0 | 1 | −13π/16 |
| 1 | 0 | 1 | 0 | −11π/16 |
| 1 | 0 | 1 | 1 | −9π/16 |
| 1 | 1 | 0 | 0 | −7π/16 |
| 1 | 1 | 0 | 1 | −5π/16 |
| 1 | 1 | 1 | 0 | −3π/16 |
| 1 | 1 | 1 | 1 | −π/16 |

As shown in Table 1, a variation in phase, Δφ, is determined in accordance with a parallel data combination of 4 bits, namely, Xk, Yk, Zk and Ak. In Table 1, each parallel data combination of 4 bits, Xk, Yk, Zk and Ak, is shown as a combination of binary codes, for the convenience of explanation. Instead of such binary codes, however, gray codes exhibiting a high resistance to noise may be used for the parallel data combination.

$$Ik=Ik-1\cdot\cos\left[\Delta\phi(Xk,Yk,Zk,Ak)\right]-Qk-1\cdot\sin\left[\Delta\phi(Xk,Yk,Zk,Ak)\right]$$

$$Qk=Ik-1\cdot\sin\left[\Delta\phi(Xk,Yk,Zk,Ak)\right]+Qk-1\cdot\cos\left[\Delta\phi(Xk,Yk,Zk,Ak)\right] \quad (1)$$

In the above Equation (1), Ik is a current in-phase component modulation signal, whereas Qk is a current quadrature-phase component modulation signal. In addition, Ik−1 and Qk−1 are in-phase and quadrature-phase component modulation signals from the previous pulse interval, respectively.

As mentioned above, the conventional π/16-shifted 16-DPSK modulation signal generating apparatus converts a serial binary data stream into 4-bit parallel data combinations, thereby deriving a variation in phase. Using the derived phase variation, the apparatus generates an in-phase component modulation signal Ik and a quadrature-phase component modulation signal Qk. In order to derive the in-phase and quadrature-phase component modulation signals Ik and Qk, a calculation using Equation (1) is executed. In other words, it is necessary to carry out calculations such as sine function, cosine function, multiplication, addition and subtraction. However, it is difficult to practically configure hardware for processing such calculations. Although hardware for the calculation of Equation (1) may be configured, its configuration is considerably complex. Where the calculation of Equation (1) is processed using software, there is a problem in that a considerably lengthy computation time is required for the processing.

SUMMARY OF THE INVENTION

Therefore, an object of the invention is to provide an apparatus for generating a π/n-shifted n-DPSK modulation signal in a digital transfer system, which apparatus has a simplified configuration.

Another object of the invention is to provide an apparatus for and a method of generating a π/n-shifted n-DPSK modulation signal in a digital transfer system, which apparatus and method are capable of reducing the processing time required for the generation of the signal.

In accordance with one aspect, the present invention provides an apparatus for generating π/n-shifted n-differential encoded phase shift keying modulation signals, comprising: a serial-to-parallel converter for converting a serial binary data stream into parallel binary data streams; an output phase index determining unit including an output phase index determination table stored with indexes indicative of phase variations respectively associated with all combinations of parallel binary data streams output from the serial-to-parallel converter, the output phase index determining unit serving to determine, from the output phase index determination table, an index indicative of a variation in phase associated with a combination of parallel binary data streams currently output from the serial-to-parallel converter, and determining an index indicative of a current output phase based on the determined phase variation index along with a previous phase index, which is an index of an output phase determined in a previous pulse interval, while storing the determined current output phase index to use the stored index as a previous phase index in a next pulse interval; and an output value determining unit including an output value determination table stored with output values associated with a selected one of quadrature-phase and in-phase component modulation signals and respectively assigned with output value indexes, the output value determining unit serving to determine an output value index corresponding to the current output phase index output from the output phase index determining unit, determining an output value of the selected modulation signal corresponding to the determined output value index from the output value determination table, and outputting the determined output value as the selected modulation signal, while incrementing or decrementing the determined output value index by a predetermined number of indexes, determining an output value of the selected modulation signal corresponding to the resultant output value index from the output value determination table, and outputting the determined output value as the remaining modulation signal.

In accordance with another aspect, the present invention provides a method for generating π/n shifted n-differential encoded phase shift keying modulation signals, comprising the steps of (a) converting a serial binary data stream into m bits parallel binary data streams from a signal converter; (b) determining an index indicative of a variation in phase associated with the parallel binary data streams; (c) determining an output phase index value to obtain a current output phase index using a determined phase variation index and a previous phase index which is an output phase index determined in a previous pulse interval from an output phase index determination table which is using a relation such that the output phase is determined by adding the phase variation to the previous phase as an index (and can preferably be built as a decoder and output phase index determination table in memory, etc.), the determined current output phase index is then set to be the previous phase index for use in a next pulse interval to determine a next output phase index; (d) determining an output value of a modulation signal, the signal being either in-phase or quadrature phase and corresponding to the current output phase, from an output value determination table which is based on either in-phase or quadrature values corresponding to the output phase index values or extended output phase index values and by using the fact that there is a phase difference of 90° between sin φk and cos φk, and by using the decided output phase index and outputting the determined output value as the selected modulation signal; and (e) determining an output value of the remaining modulation signal corresponding to the resultant output value index from the same output value determination table by incrementing or decrementing the output value index determined at step (d) by a predetermined index value, and outputting the determined output value as the remaining modulation signal.

BRIEF DESCRIPTION OF THE DRAWINGS

Other objects and aspects of the invention will become apparent from the following description of embodiments with reference to the accompanying drawings in which.

DETAILED DESCRIPTION OF PREFERRED EMBODIMENTS

It is to be appreciated that the present invention will be described in conjunction with a preferred embodiment thereof, namely, a π/16-shifted 16-DPSK modulation signal generating apparatus. However, the present invention is not limited to such a π/16-shifted 16-DPSK modulation signal generating apparatus. The present invention may be applied to any π/n-shifted n-DPSK modulation signal generating apparatus.

Figure 2:
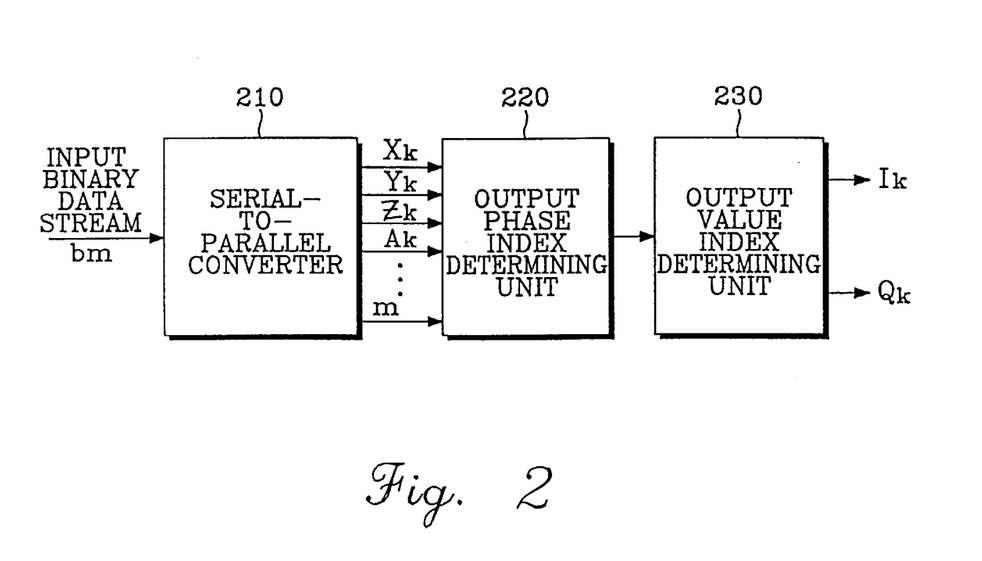
FIG. 2 is a block diagram illustrating a π/16-shifted 16-DPSK modulation signal generating apparatus according to an embodiment of the present invention.

FIG. 2 is a block diagram illustrating a π/16-shifted 16-DPSK modulation signal generating apparatus according to an embodiment of the present invention. As shown in FIG. 2, the apparatus of this embodiment includes a serial-to-parallel converter 210 adapted to convert an input binary data stream, bm, into four parallel data streams, Xk, Yk, Zk and Ak, which are combined into 4-bit parallel data combinations. The number of 4-bit data combinations is 16 ($2^4=16$). By the serial-to-parallel converter 210, the first, second, third and fourth bits of the input binary data stream, bm, are converted into 1-bit parallel streams Xk, Yk, Zk and Ak, respectively. In accordance with different combinations of such parallel bits, different variations in phase, Δφk, are exhibited as shown in Table 2. Although such phase variations may be exhibited using a variety of codes, for example, gray codes, they are exhibited herein using binary codes in order to simplify the explanation. As shown in Table 2, phase variation indexes are assigned to distinguish phase variations, Δφk, exhibited by different combinations of Xk, Yk, Zk and Ak. Such an assignment of phase variation indexes is optionally carried out by the user in a consistent manner in order to obtain a correlation between an output phase index determining unit and an output value determining unit and a correlation between a preferred process using hardware and a preferred process using software, as will be described hereinafter.

TABLE 2

| Xk | Yk | Zk | Ak | Δφk | Phase Variation Index |
|----|----|----|----|-----|----------------------|
| 0 | 0 | 0 | 0 | π/16 | 1 |
| 0 | 0 | 0 | 1 | 3π/16 | 3 |
| 0 | 0 | 1 | 0 | 5π/16 | 5 |
| 0 | 0 | 1 | 1 | 7π/16 | 7 |
| 0 | 1 | 0 | 0 | 9π/16 | 9 |
| 0 | 1 | 0 | 1 | 11π/16 | 11 |
| 0 | 1 | 1 | 0 | 13π/16 | 13 |
| 0 | 1 | 1 | 1 | 15π/16 | 15 |
| 1 | 0 | 0 | 0 | −15π/16 | 17 |
| 1 | 0 | 0 | 1 | −13π/16 | 19 |
| 1 | 0 | 1 | 0 | −11π/16 | 21 |
| 1 | 0 | 1 | 1 | −9π/16 | 23 |
| 1 | 1 | 0 | 0 | −7π/16 | 25 |
| 1 | 1 | 0 | 1 | −5π/16 | 27 |
| 1 | 1 | 1 | 0 | −3π/16 | 29 |
| 1 | 1 | 1 | 1 | −π/16 | 31 |

Values to be finally derived in accordance with the present invention are an in-phase component modulation signal Ik and a quadrature-phase component modulation signal Qk. These in-phase and quadrature-phase modulation signals Ik and Qk are expressed by the following Equation (2):

$$Ik = Ik-1 \cdot \cos[\Delta\phi k \ (Xk,Yk,Zk,Ak)] - Qk-1 \cdot \sin[\Delta\phi k \ (Xk,Yk,Zk,Ak)]$$

$$Qk = Ik-1 \cdot \sin[\Delta\phi k \ (Xk,Yk,Zk,Ak)] + Qk-1 \cdot \cos[\Delta\phi k \ (Xk,Yk,Zk,Ak)] \quad (2)$$

In the above Equation (2), Ik denotes a current in-phase component modulation signal whereas Qk denotes a current quadrature-phase component modulation signal. In addition, Ik−1 and Qk−1 are in-phase and quadrature-phase component modulation signals from the previous pulse interval, respectively. In order to determine values of such in-phase and quadrature-phase component modulation signals Ik and Qk at every pulse interval, it is necessary to carry out calculations such as sine function, cosine function, multiplication, addition and subtraction. After completing such calculations, it is possible to determine a current output phase. In accordance with the present invention, however, an output phase index corresponding to an output phase is first determined using an output phase index determination table (Table 3) in an output phase index determining unit 220 (FIG. 2), without the need for determining in-phase and quadrature-phase component modulation signals Ik and Qk through a number of calculations. Such a determination is based on the definition that an output phase φk exhibited in DPSK modulation has a variation, Δφk (determined by Xk, Yk, Zk and Ak), from the previous output phase, Δφk−1, which preceded the current output phase φk.

That is, the output phase determining unit 220 determines a current output phase ($\phi_k$) index by the relationship $\phi_k = \phi_{k-1} + \Delta\phi_k$. The determining unit first selects the phase variation ($\Delta\phi_k$) index in the appropriate column of Table 3. The phase variation ($\Delta\phi_k$) index corresponds to the currently input four bit combination. The determining unit then selects the row which corresponds to the previous phase ($\phi_{k-1}$) index. The determining unit then determines the current output phase ($\phi_k$) index as the value found at the intersection of the selected row and column in Table 3, which corresponds to the sum ($\phi_{k-1} + \Delta\phi_k$). In this case, the current output phase index has a relation to the previous output phase index, as shown in the output phase index determination table (Table 3). The output phase index determining unit 220, which is included in the π/16-shifted 16-DPSK modulation signal generating apparatus according to the present invention, is a unit adapted to process indexes having the input/output relations shown in Table 3. Also, the relationship between 4-bit combinations and phase indexes, such as shown in Table 2, may be stored in unit 220.

TABLE 3

Output Phase Index Determination Table

| PP[1] (φk-1) | PPI[2] | Current Phase Variation Index | | | | | | | | | | | | | | |
|---|---|---|---|---|---|---|---|---|---|---|---|---|---|---|---|---|
| | | 1 | 3 | 5 | 7 | 9 | 11 | 13 | 15 | 17 | 19 | 21 | 23 | 25 | 27 | 29 | 31 |
| 0 | 0 | 1 | 3 | 5 | 7 | 9 | 11 | 13 | 15 | 17 | 19 | 21 | 23 | 25 | 27 | 29 | 31 |
| π/16 | 1 | 2 | 4 | 6 | 8 | 10 | 12 | 14 | 16 | 18 | 20 | 22 | 24 | 26 | 28 | 30 | 0 |
| 2π/16 | 2 | 3 | 5 | 7 | 9 | 11 | 13 | 15 | 17 | 19 | 21 | 23 | 25 | 27 | 29 | 31 | 1 |
| 3π/16 | 3 | 4 | 6 | 8 | 10 | 12 | 14 | 16 | 18 | 20 | 22 | 24 | 26 | 28 | 30 | 0 | 2 |
| 4π/16 | 4 | 5 | 7 | 9 | 11 | 13 | 15 | 17 | 19 | 21 | 23 | 25 | 27 | 29 | 31 | 1 | 3 |
| 5π/16 | 5 | 6 | 8 | 10 | 12 | 14 | 16 | 18 | 20 | 22 | 24 | 26 | 28 | 30 | 0 | 2 | 4 |
| 6π/16 | 6 | 7 | 9 | 11 | 13 | 15 | 17 | 19 | 21 | 23 | 25 | 27 | 29 | 31 | 1 | 3 | 5 |
| 7π/16 | 7 | 8 | 10 | 12 | 14 | 16 | 18 | 20 | 22 | 24 | 26 | 28 | 30 | 0 | 2 | 4 | 6 |
| 8π/16 | 8 | 9 | 11 | 13 | 15 | 17 | 19 | 21 | 23 | 25 | 27 | 29 | 31 | 1 | 3 | 5 | 7 |
| 9π/16 | 9 | 10 | 12 | 14 | 16 | 18 | 20 | 22 | 24 | 26 | 28 | 30 | 0 | 2 | 4 | 6 | 8 |
| 10π/16 | 10 | 11 | 13 | 15 | 17 | 19 | 21 | 23 | 25 | 27 | 29 | 31 | 1 | 3 | 5 | 7 | 9 |
| 11π/16 | 11 | 12 | 14 | 16 | 18 | 20 | 22 | 24 | 26 | 28 | 30 | 0 | 2 | 4 | 6 | 8 | 10 |
| 12π/16 | 12 | 13 | 15 | 17 | 19 | 21 | 23 | 25 | 27 | 29 | 31 | 1 | 3 | 5 | 7 | 9 | 11 |
| 13π/16 | 13 | 14 | 16 | 18 | 20 | 22 | 24 | 26 | 28 | 30 | 0 | 2 | 4 | 6 | 8 | 10 | 12 |
| 14π/16 | 14 | 15 | 17 | 19 | 21 | 23 | 25 | 27 | 29 | 31 | 1 | 3 | 5 | 7 | 9 | 11 | 13 |
| 15π/16 | 15 | 16 | 18 | 20 | 22 | 24 | 26 | 28 | 30 | 0 | 2 | 4 | 6 | 8 | 10 | 12 | 14 |
| 16π/16 | 16 | 17 | 19 | 21 | 23 | 25 | 27 | 29 | 31 | 1 | 3 | 5 | 7 | 9 | 11 | 13 | 15 |
| 17π/16 | 17 | 18 | 20 | 22 | 24 | 26 | 28 | 30 | 0 | 2 | 4 | 6 | 8 | 10 | 12 | 14 | 16 |
| 18π/16 | 18 | 19 | 21 | 23 | 25 | 27 | 29 | 31 | 1 | 3 | 5 | 7 | 9 | 11 | 13 | 15 | 17 |
| 19π/16 | 19 | 20 | 22 | 24 | 26 | 28 | 30 | 0 | 2 | 4 | 6 | 8 | 10 | 12 | 14 | 16 | 18 |
| 20π/16 | 20 | 21 | 23 | 25 | 27 | 29 | 31 | 1 | 3 | 5 | 7 | 9 | 11 | 13 | 15 | 17 | 19 |
| 21π/16 | 21 | 22 | 24 | 26 | 28 | 30 | 0 | 2 | 4 | 6 | 8 | 10 | 12 | 14 | 16 | 18 | 20 |
| 22π/16 | 22 | 23 | 25 | 27 | 29 | 31 | 1 | 3 | 5 | 7 | 9 | 11 | 13 | 15 | 17 | 19 | 21 |
| 23π/16 | 23 | 24 | 26 | 28 | 30 | 0 | 2 | 4 | 6 | 8 | 10 | 12 | 14 | 16 | 18 | 20 | 22 |
| 24π/16 | 24 | 25 | 27 | 29 | 31 | 1 | 3 | 5 | 7 | 9 | 11 | 13 | 15 | 17 | 19 | 21 | 23 |
| 25π/16 | 25 | 26 | 28 | 30 | 0 | 2 | 4 | 6 | 8 | 10 | 12 | 14 | 16 | 18 | 20 | 22 | 24 |
| 26π/16 | 26 | 27 | 29 | 31 | 1 | 3 | 5 | 7 | 9 | 11 | 13 | 15 | 17 | 19 | 21 | 23 | 25 |
| 27π/16 | 27 | 28 | 30 | 0 | 2 | 4 | 6 | 8 | 10 | 12 | 14 | 16 | 18 | 20 | 22 | 24 | 26 |

TABLE 3-continued

Output Phase Index Determination Table

| PP[1] | | Current Phase Variation Index | | | | | | | | | | | | | | |
|---|---|---|---|---|---|---|---|---|---|---|---|---|---|---|---|---|
| (φk-1) | PPI[2] | 1 | 3 | 5 | 7 | 9 | 11 | 13 | 15 | 17 | 19 | 21 | 23 | 25 | 27 | 29 | 31 |
| 28π/16 | 28 | 29 | 31 | 1 | 3 | 5 | 7 | 9 | 11 | 13 | 15 | 17 | 19 | 21 | 23 | 25 | 27 |
| 29π/16 | 29 | 30 | 0 | 2 | 4 | 6 | 8 | 10 | 12 | 14 | 16 | 18 | 20 | 22 | 24 | 26 | 28 |
| 30π/16 | 30 | 31 | 1 | 3 | 5 | 7 | 9 | 11 | 13 | 15 | 17 | 19 | 21 | 23 | 25 | 27 | 29 |
| 31π/16 | 31 | 0 | 2 | 4 | 6 | 8 | 10 | 12 | 14 | 16 | 17 | 20 | 22 | 24 | 26 | 28 | 30 |

** [1]Previous Phase;
[2]Previous Phase Index

The output phase index determining unit 220 designates a desired output phase index, based on an input phase variation index and a previous phase index from Table 3. That is, the output phase index determination table (Table 3) indicates, by use of an index, the relation between the current and previous output phases which exhibit a certain phase variation therebetween. Accordingly, the output phase index determining unit 220 determines an output phase index and then sends the determined output phase index to an output value determining unit 230. The output phase index determining unit 220 also delays or stores the current output phase index so that the delayed or stored output phase index can be subsequently used as the previous phase (φk−1) index. Specifically, when the output phase index determining unit 220 receives a phase variation index, it reads an output phase index, which is indicated at the cross point in Table 3 between the current phase variation index (column) and the phase index determined for the immediately preceding pulse interval (row). The output phase index determining unit 220 then sends the selected output phase index to the output value determining unit 230. At the same time, the output phase index determining unit 220 delays or stores the output phase index determined, as mentioned above, in order to use that output phase index as the previous phase index in a next pulse interval. In such a manner, it is possible to determine a new output phase index every time a phase variation index based on new data is input to the phase index determining unit 220. Such functions of the output phase index determining unit 220 may be realized using conventional delay circuits and decoders.

The output value determining unit 230, which is also included in the π/16-shifted 16-DPSK modulation signal generating apparatus, determines in-phase and quadrature-phase component modulation signals Ik and Qk, based on the output phase index determined in the output phase index determining unit 220. The in-phase and quadrature-phase component modulation signals Ik and Qk may be preferably derived, based on the output phase index from the output phase index determining unit 220, from only one table which stores either cosine function values of successive output phases as values of in-phase component modulation signals Ik (Ik=cos φk) or sine function values of those output phases as values of quadrature-phase component modulation signals Qk (Qk=sin φk). In accordance with the present invention, an output value determination table, such as the following Table 4, is stored in the output value determining unit 230. Table 4 is preferably stored with only sine function values of output phases φk respectively corresponding to successive output phase indexes. In accordance with the present invention, the output value index determining unit 230 reads the sine function value of an output phase φk corresponding to an output phase index provided by the output phase index determining unit 220, thereby deriving a quadrature-phase component modulation signal Qk (Qk=sin φk). In order to derive in-phase component modulation signal Ik, the output value index determining unit 230 increments the output phase index by 8, which is equivalent to a 90° phase shift. Such incrementing has the effect of adding an additional 90° phase shift to the current output phase, and since Ik=cos φk and cos φk=sin φk+90° the in-phase component signal Ik may be derived from the quadrature-phase component signal Qk by exploiting this trigonometric relationship. Accordingly, once incremented, the output value index determining unit 230 then reads the sine function value corresponding to the incremented index as an in-phase component modulation signal Ik. Thus, both the in-phase and quadrature-phase component modulation signals Ik and Qk are derived.

Alternatively, the derivation of in-phase and quadrature-phase component modulation signals Ik and Qk may be achieved using a table which is stored with values different from those of Table 4 which subscribes to the fact that there is a phase difference of 90° between sin φk and cos φk. In this case, it is required to increment or decrement the output phase index derived from the output phase index determining unit 220 as in the above-mentioned case associated with Table 4. In other words, the quadrature-phase component signals Qk may be derived from the in-phase component signals Ik by exploiting the same trigonometric relationship. However, it is also to be understood that Table 4 can include a separate sin φk look-up column and a separate cos φk look-up column so that Qk and Ik may be independently derived.

TABLE 4

| Index | φk | sin φk |
|---|---|---|
| 0 | 0 | 0 |
| 1 | π/16 | sin π/16 |
| 2 | 2π/16 | sin π/8 |
| 3 | 3π/16 | sin 3π/16 |
| 4 | 4π/16 | 1/√2 |
| 5 | 5π/16 | sin 5π/16 |
| 6 | 6π/16 | sin 3π/8 |
| 7 | 7π/16 | sin 7π/16 |
| 8 | 8π/16 | 1 |
| 9 | 9π/16 | sin 9π/16 |
| 10 | 10π/16 | sin 5π/8 |
| 11 | 11π/16 | sin 11π/16 |
| 12 | 12π/16 | 1/√2 |
| 13 | 13π/16 | sin 13π/16 |
| 14 | 14π/16 | sin 7π/8 |
| 15 | 15π/16 | sin 15π/16 |
| 16 | 16π/16 | 0 |
| 17 | 17π/16 | sin 17π/16 |
| 18 | 18π/16 | sin 9π/8 |
| 19 | 19π/16 | sin 19π/16 |
| 20 | 20π/16 | −1/√2 |

TABLE 4-continued

| Index | φk | sin φk |
|---|---|---|
| 21 | 21π/16 | sin 21π/16 |
| 22 | 22π/16 | sin 11π/8 |
| 23 | 23π/16 | sin 23π/16 |
| 24 | 24π/16 | −1 |
| 25 | 25π/16 | sin 25π/16 |
| 26 | 26π/16 | sin 13π/8 |
| 27 | 27π/16 | sin 27π/16 |
| 28 | 28π/16 | −1/√2 |
| 29 | 29π/16 | sin 29π/16 |
| 30 | 30π/16 | sin 15π/8 |
| 31 | 31π/16 | sin 31π/16 |

As mentioned above, the output value determining unit 230, which includes the output value determination table, namely, Table 4, first preferably determines the value of sin φk based on the output phase index from the output phase index determining unit 220. Thereafter, the output value determining unit 230 determines an index associated with the value of cos φk by adding 8 to the output phase index obtained from the output phase index determining unit 220 in accordance with the fact that there is a phase difference of 90° between sin φk and cos φk. Based on the modified index, the output value determining unit 230 then determines the value of cos φk from Table 4. That is, it is possible to directly drive in-phase and quadrature-phase component modulation signals Ik and Qk from the output value determination table, using the output phase index control. Alternatively, the derivation of in-phase and quadrature-phase component modulation signals Ik and Qk may be achieved using an output value determination table stored with values of cos φk while being adjusted in output phase index or using another table configured different from Table 4 while utilizing the fact that there is a phase difference of 90° between sin φk and cos φk.

The following is an example illustrating a preferred method for deriving the in-phase and quadrature-phase component signals, Ik and Qk according to the invention. Assume that the output phase φk of the previous pulse interval is 5π/16 which corresponds to an index of 5 (Table 4). Now assume that the next 4-bit parallel combination of Xk, Yk, Zk and Ak is 0011. Referring to Table 2 indicates that the binary combination 0011 corresponds to a current phase variation index of 7. Referring now to Table 3, the current output phase is determined by matching the current phase variation index, 7, with the previous index, 5, which can be seen to result in a current output phase index of 12. This current output phase index is sent to unit 230 from unit 220. In unit 230, the current output phase index is referenced against look-up Table 4 to indicate that an index of 12 refers to an output phase φk of 12π/16. From this current output phase both the sine and cosine values may be derived, thereby deriving the quadrature-phase and in-phase modulation signals Qk and Ik, as explained above.

Figure 3:
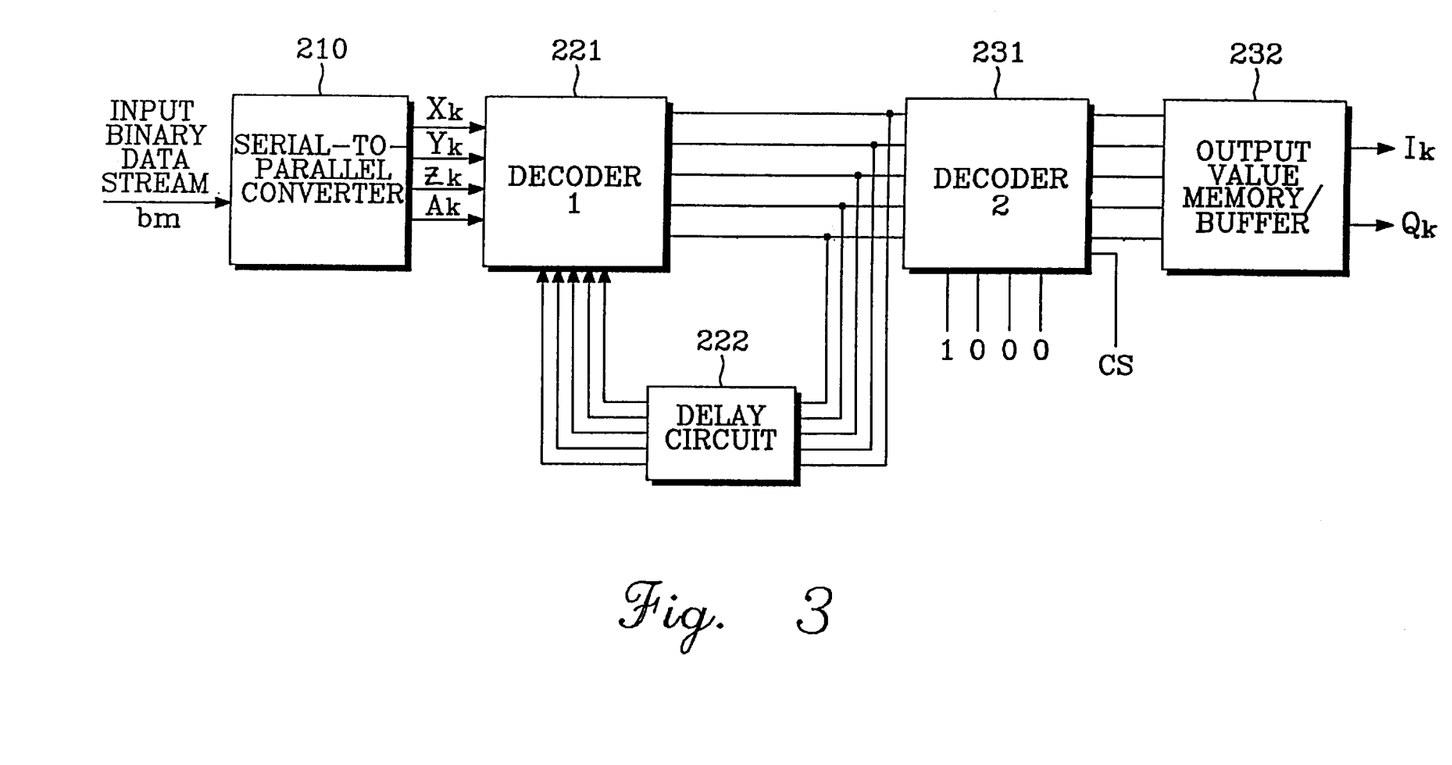
FIG. 3 is a block diagram illustrating a π/16-shifted 16-shifted 16-DPSK modulation signal generating apparatus according to another embodiment of the present invention.

FIG. 3 is a block diagram illustrating a π/16-shifted 16-DPSK modulation signal generating apparatus according to another embodiment of the present invention. In FIG. 3, elements respectively corresponding to those in FIG. 2 are denoted by the same reference numerals. As shown in FIG. 3, the apparatus of this embodiment includes a serial-to-parallel converter 210 adapted to convert an input binary data stream, bm, into four split data streams, Xk, Yk, Zk and Ak, which are combined into 4-bit parallel data combinations. Each 4-bit data combination from the serial-to-parallel converter 210 is applied to a first decoder 221 which sends its output to a second decoder 231. The output from the first decoder 221 is fed back to the first decoder 221 via a delay circuit 222. The delay circuit 222 applies an output phase index from the previous pulse interval, namely, the previous phase index, to the first decoder 221. Accordingly, for each current pulse interval, the first decoder 221 determines an output phase index, based on the split data streams Xk, Yk, Zk and Ak (4-bit data) received from the serial-to-parallel converter 210 in the current pulse interval along with the previous phase index received from the delay circuit 222. Specifically, the first decoder 221 sends the determined output phase index in the form of binary data to the second decoder 231. An output value memory/buffer 232 is coupled to the second decoder 231. The output value memory/buffer 232 is stored with an output value determination table which may be Table 4, for example. Based on the binary data indicative of the output phase index determined by the first decoder 221, the second decoder 231 reads a desired quadrature-phase component modulation signal Qk from an output value determination table, which may, for example be Table 4, stored in the output value memory/buffer 232. The second decoder 231 also receives a chip selection signal CS. When receiving the chip selection signal CS, the second decoder 231 executes an addition of the binary value 1000, namely, 8 (corresponding to the index value of a 90° phase shift) to the output phase index received from the first decoder 221, thereby deriving an index for determining an in-phase component modulation signal Ik. That is, the second decoder 231 reads, from the output value determination table, an in-phase component modulation signal Ik corresponding to the index incremented by 8 from the output phase index. The second decoder 231 finally outputs the derived in-phase and quadrature-phase component modulation signals Ik and Qk via the output value memory/buffer 232. The output value memory/buffer 232 serves to output the derived in-phase and quadrature-phase component modulation signals Ik and Qk in the same time interval.

Figure 4:
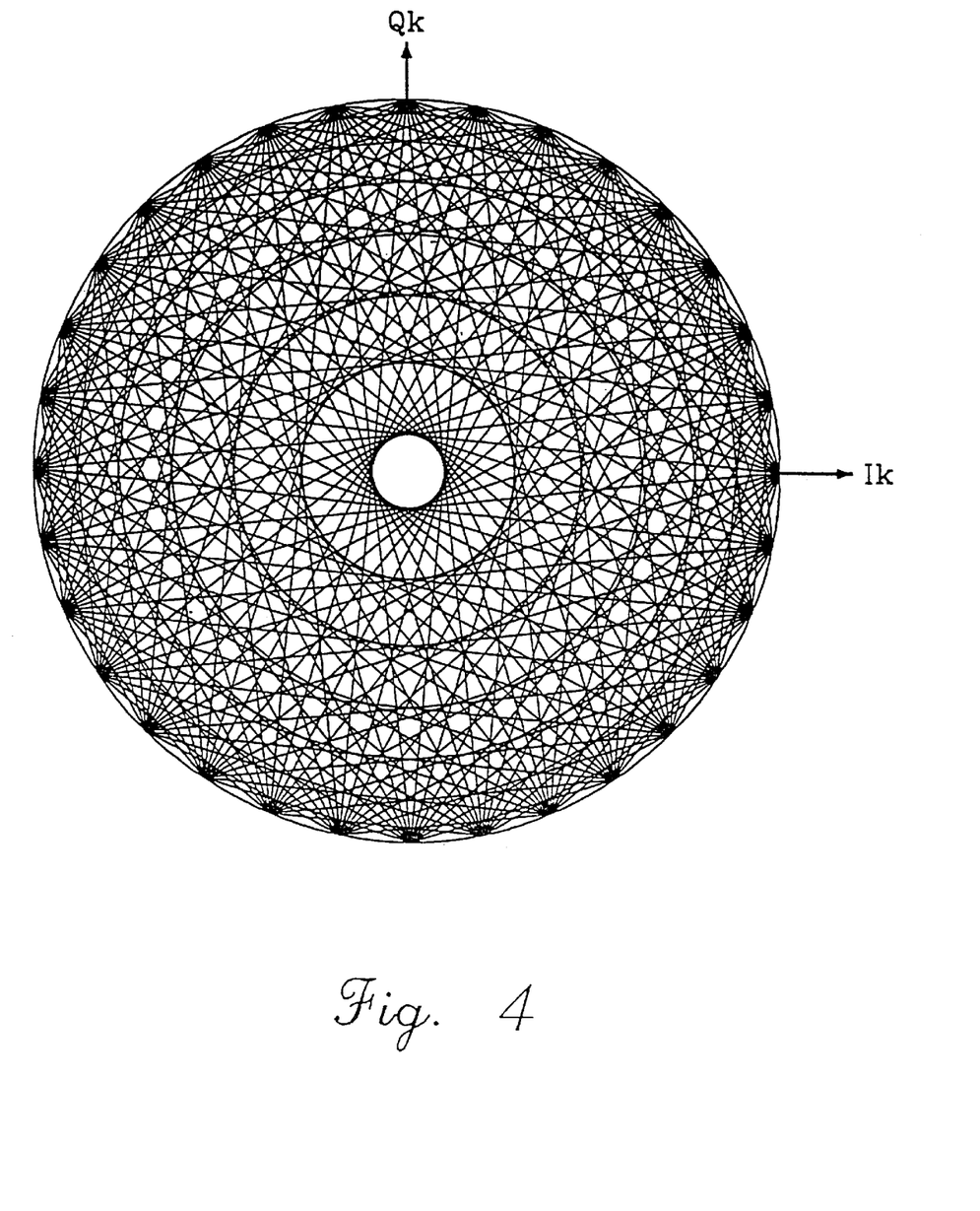
FIG. 4 is a schematic view illustrating a constellation of signal points associated with a π/16-shifted 16-DPSK modulation signal generating apparatus according to the present invention.

FIG. 4 is a schematic view illustrating a constellation of signal points associated with the π/16-shifted 16-DPSK modulation signal generating apparatus according to the present invention. Such a constellation of signal points is the same in both embodiments of the present invention respectively shown in FIGS. 2 and 3.

Although a π/16-DPSK modulation signal generating apparatus has been described in the embodiments of the present invention shown in FIGS. 2 and 3, the present invention is not limited to such a π/16-shifted 16-DPSK modulation signal generating apparatus. It is to be appreciated that the present invention may be extended to any π/n-shifted n-DPSK modulation signal generating apparatus.

Figure 5:
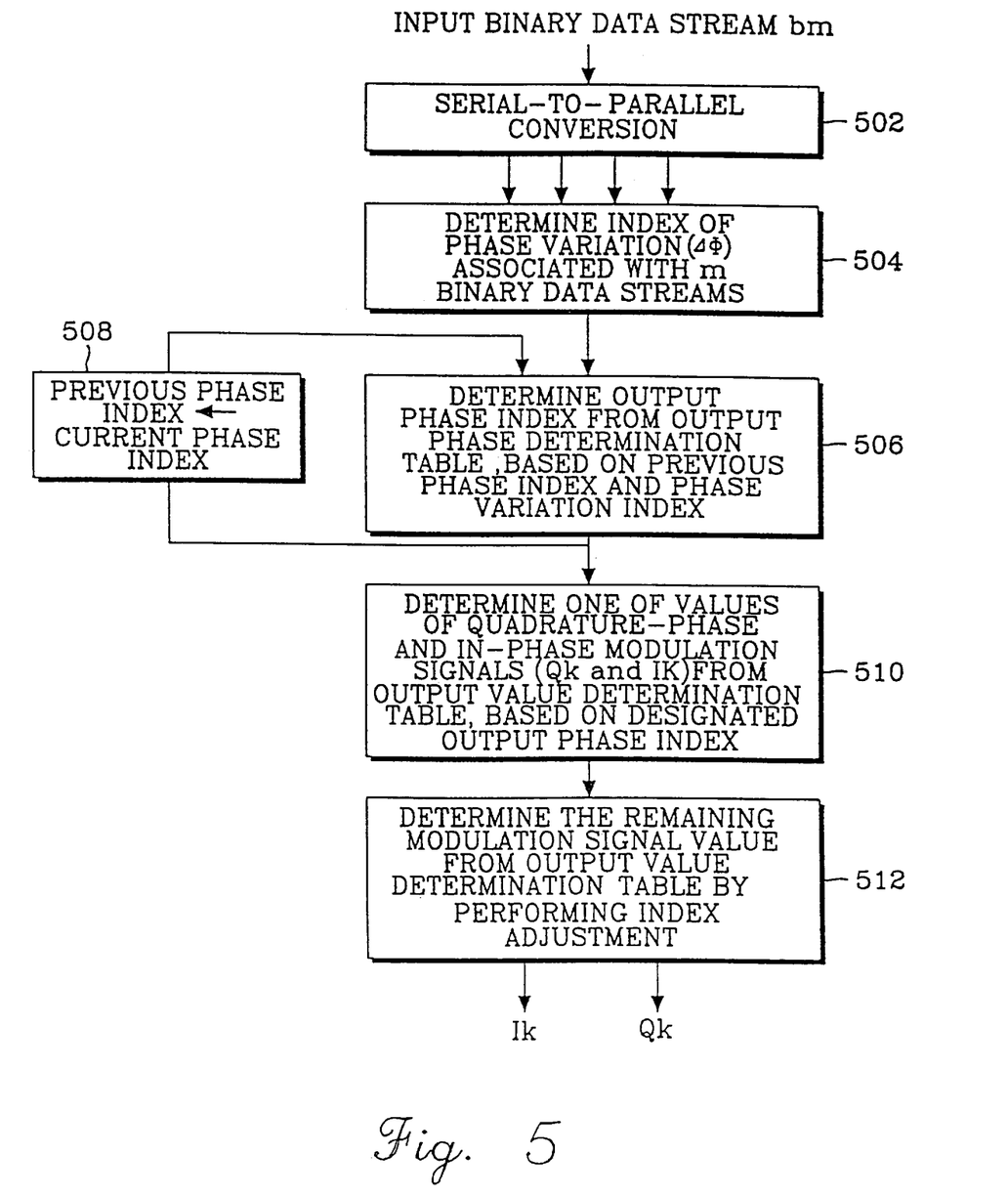
FIG. 5 is a flow chart illustrating sequential processing steps of a method for generating a π/n-shifted n-DPSK modulation signal in accordance with the present invention.

FIG. 5 is a flow chart illustrating sequential processing steps of a method for generating a π/n-shifted n-DPSK modulation signal in accordance with the present invention. In accordance with the a preferred method of the present invention, an input binary data stream, bm, is first converted into m-bits parallel binary data streams, namely, an m-bit parallel combination, at step 502 of FIG. 5. A phase variation index corresponding to the m binary data streams is then determined at step 504. At step 506, an output phase index is determined from an output phase determination table which may be, for example, Table 3, based on a previous phase index along with the phase variation index determined at step 504. The previous phase index is the index of an output phase in the previous pulse interval. As mentioned above, the output phase is related to the previous phase in that it corresponds to a value obtained by adding the phase variation to the previous phase. For the processing at step 506, the currently derived phase index is set at step 508 so that it can be subsequently used as a previous phase index. At step 510, a selected one of in-phase and quadrature-phase component modulation signals Ik and Qk is determined using an output value determination table, based on the output phase index determined at step 506. As mentioned above, an output value determination table is preferably stored with values associated with only a selected one of in-phase and quadrature-phase component modulation signals Ik and Qk, in accordance with the fact that there is a phase difference of 90° between those in-phase and quadrature-phase component modulation signals Ik and Qk. For example, this output value determination table may be Table 4. Accordingly, once the selected one of in-phase and quadrature-phase component modulation signals Ik and Qk is determined, based on the output phase index, the other modulation signal can also be determined using the determined modulation signal as a reference. At step 512, the output phase index is incremented or decremented by an index value corresponding to a phase of 90°. Using the resultant phase index, a value corresponding to the remaining modulation signal is read from the output value determination table. Thus, both the in-phase and quadrature-phase component modulation signals Ik and Qk are determined.

Where the above-mentioned processing is executed using a $\pi/n$-shifted n-DPSK modulation signal generating apparatus according to the present invention, it should be understood that the following rules apply:

(1) The number of phase variations is determined. Where the number of data streams produced by a data conversion of the serial-to-parallel converter is m, it is possible to control $2^m$ phase variations ($2^m$=n). In the case of $\pi/4$-shifted DPSK, m is 2. In the case of $\pi/8$-shifted DPSK, m is 3. Here, n is indicative of the total number of phase variations $\Delta\phi k(\phi k=\phi k-1+\Delta\phi k)$ used in the output phase index determining unit. In the case of $\pi/n$-shifted n-DPSK, $\Delta\phi k$, which is indicative of a physical variation in phase, may be $\pi/n$, $3\pi/n$, $5\pi/n$, . . . Phase variation indexes are assigned to be used in the output phase index determining unit and output value determining unit. Such phase variation indexes may be 1, 3, 5, . . . Alternatively, phase variation indexes assigned as 1, 2, 3, 4, . . . may be used to distinguish phase variations from one another. In either case, the total number of phase variations corresponds to n (n =$2^m$).

(2) The output phase index determining unit is configured to determine an output phase by use of a previous phase and a variation in phase. In the case of differential encoding, the number of output phases or previous phases corresponds to $2^{m-1}$ when the number of phase variations is $2^m$. The assignment of indexes for output phases is made in such a manner that an integer of 0 is assigned as the index for an output phase of 0° while assigning integers sequentially incremented from the integer of 0 by 1 as the indexes for output phases of $\pi/n$ to $(2n-1)\pi/n$, respectively. Using those output phase indexes, values of output phases are configured in such a manner that they satisfy the equation of $\phi k=\phi k-1+\Delta\phi k$, that is, the condition in which the current output phase corresponds to a value obtained by adding a variation in phase, based on input data, to a previous output phase preceding the current output phase. The output phase indexes may be stored in a table which may be, for example, Table 3, in such a manner that each of them is indicated on a cross point of the table between an associated phase variation index and an associated previous phase index, both indicated on the table. The current output phase index is delayed or stored so that it can be subsequently used as a previous phase index in a next pulse interval, along with a next phase variation index, to determine a next output phase index. The output phase index determining unit may be configured using a logic combination of delay or memory units and decoders.

(3) The output value determining unit is stored with a Qk table which is stored with values of Qk (Qk=sin $\phi k$). The number of values Qk corresponds to $2^{m+1}$30 $2^{m-1}$. In the Qk table, values of sin ($\alpha\pi/n$) are also stored. The values of sin ($\alpha\pi/n$) are obtained while sequentially incrementing $\alpha$ by 1 from 0 to $2^{m+1}+2^{m-1}-1$. Accordingly, the output value determining unit can designate desired values stored in the table while incrementing or decrementing the output phase index derived in the output phase index determining unit of the $\pi/n$-shifted n-DPSK modulation signal generating apparatus. Although the table is configured using values of sin $\phi k$, other types of tables may be made in accordance with the fact that there is a phase difference of 90° between values of sin $\phi k$ and cos $\phi k$. In this case, it is possible to derive both the quadrature-phase and in-phase component modulation signals Qk and Ik from a single table while incrementing or decrementing the output phase index.

(4) For the determination of an output value, the output value determining unit designates an index corresponding to the output phase index determined by the output phase index determining unit, thereby deriving a desired Qk value stored therein. The output value determining unit then adds $2^{m-1}$ to the output phase index obtained from the output phase index determining unit and reads a stored Ik value corresponding to the resultant index. Thus, both the Qk and Ik values are derived.

As apparent from the above description, the present invention provides an apparatus for and a method of generating a $\pi/n$-shifted n-DPSK modulation signal in a digital transfer system. Such apparatus and method are capable of determining both quadrature-phase and in-phase modulation signals from a single output value determination table. In accordance with the present invention, an output phase index is first determined from an output phase determination table, based on an index associated with a variation in phase occurring when serial binary data is converted into parallel data, along with a previous phase index. Based on the output phase index, a selected one of the quadrature-phase and in-phase modulation signals is determined from the output value determination table. After adjusting the output phase index, the remaining modulation signal is determined from the output value determination table. Accordingly, it is unnecessary to carry out complex calculations, such as sine function, cosine function and multiplication, which are required in conventional methods. In this regard, it is possible to more rapidly derive reliable modulated output signals.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating π/16-shifted 16-differential encoded phase shift keying modulation signals, comprising:
   a serial-to-parallel converter for converting a serial binary data stream into four parallel binary data streams, wherein each combination of parallel binary data streams output from the serial-to-parallel converter corresponds to a phase variation index;
   an output phase index determining unit including an output phase index determination table having columns indexed by the current phase variation index and rows indexed by a past output phase index, and further storing current output phase indexes, said output phase index determining unit determining a current output phase index by finding the intersection on the output phase index determination table of the current phase variation index and the past output phase index said output phase index determining unit further saving the current output phase index to be used as the past output phase index in the next time interval; and
   an output signal determining unit including an output signal determination table having each quadrature-phase modulation output signal associated with the current output phase index, said output signal determining unit looking up the current output phase index in the output signal determination table to determine the current quadrature-phase modulation output signal, said output signal determining unit further adding 8 to the current output phase index to determine the current in-phase modulation output signal by looking up the added output phase index in the output signal determination table;
   wherein the combinations of parallel binary data streams output from the serial-to-parallel converter corresponds to phase variation indexes in the following manner:

| Bit 1 | Bit 2 | Bit 3 | Bit 4 | Phase Variation Index |
|---|---|---|---|---|
| 0 | 0 | 0 | 0 | 1 |
| 0 | 0 | 0 | 1 | 3 |
| 0 | 0 | 1 | 0 | 5 |
| 0 | 0 | 1 | 1 | 7 |
| 0 | 1 | 0 | 0 | 9 |
| 0 | 1 | 0 | 1 | 11 |
| 0 | 1 | 1 | 0 | 13 |
| 0 | 1 | 1 | 1 | 15 |
| 1 | 0 | 0 | 0 | 17 |
| 1 | 0 | 0 | 1 | 19 |
| 1 | 0 | 1 | 0 | 21 |
| 1 | 0 | 1 | 1 | 23 |
| 1 | 1 | 0 | 0 | 25 |
| 1 | 1 | 0 | 1 | 27 |
| 1 | 1 | 1 | 0 | 29 |
| 1 | 1 | 1 | 1 | 31 | wherein the output phase index determination table takes the following form:

|    | 1  | 3  | 5  | 7  | 9  | 11 | 13 | 15 | 17 | 19 | 21 | 23 | 25 | 27 | 29 | 31 |
|----|----|----|----|----|----|----|----|----|----|----|----|----|----|----|----|----|
| 0  | 1  | 3  | 5  | 7  | 9  | 11 | 13 | 15 | 17 | 19 | 21 | 23 | 25 | 27 | 29 | 31 |
| 1  | 2  | 4  | 6  | 8  | 10 | 12 | 14 | 16 | 18 | 20 | 22 | 24 | 26 | 28 | 30 | 0  |
| 2  | 3  | 5  | 7  | 9  | 11 | 13 | 15 | 17 | 19 | 21 | 23 | 25 | 27 | 29 | 31 | 1  |
| 3  | 4  | 6  | 8  | 10 | 12 | 14 | 16 | 18 | 20 | 22 | 24 | 26 | 28 | 30 | 0  | 2  |
| 4  | 5  | 7  | 9  | 11 | 13 | 15 | 17 | 19 | 21 | 23 | 25 | 27 | 29 | 31 | 1  | 3  |
| 5  | 6  | 8  | 10 | 12 | 14 | 16 | 18 | 20 | 22 | 24 | 26 | 28 | 30 | 0  | 2  | 4  |
| 6  | 7  | 9  | 11 | 13 | 15 | 17 | 19 | 21 | 23 | 25 | 27 | 29 | 31 | 1  | 3  | 5  |
| 7  | 8  | 10 | 12 | 14 | 16 | 18 | 20 | 22 | 24 | 26 | 28 | 30 | 0  | 2  | 4  | 6  |
| 8  | 9  | 11 | 13 | 15 | 17 | 19 | 21 | 23 | 25 | 27 | 29 | 31 | 1  | 3  | 5  | 7  |
| 9  | 10 | 12 | 14 | 16 | 18 | 20 | 22 | 24 | 26 | 28 | 30 | 0  | 2  | 4  | 6  | 8  |
| 10 | 11 | 13 | 15 | 17 | 19 | 21 | 23 | 25 | 27 | 29 | 31 | 1  | 3  | 5  | 7  | 9  |
| 11 | 12 | 14 | 16 | 18 | 20 | 22 | 24 | 26 | 28 | 30 | 0  | 2  | 4  | 6  | 8  | 10 |
| 12 | 13 | 15 | 17 | 19 | 21 | 23 | 25 | 27 | 29 | 31 | 1  | 3  | 5  | 7  | 9  | 11 |
| 13 | 14 | 16 | 18 | 20 | 22 | 24 | 26 | 28 | 30 | 0  | 2  | 4  | 6  | 8  | 10 | 12 |
| 14 | 15 | 17 | 19 | 21 | 23 | 25 | 27 | 29 | 31 | 1  | 3  | 5  | 7  | 9  | 11 | 13 |
| 15 | 16 | 18 | 20 | 22 | 24 | 26 | 28 | 30 | 0  | 2  | 4  | 6  | 8  | 10 | 12 | 14 |
| 16 | 17 | 19 | 21 | 23 | 25 | 27 | 29 | 31 | 1  | 3  | 5  | 7  | 9  | 11 | 13 | 15 |
| 17 | 18 | 20 | 22 | 24 | 26 | 28 | 30 | 0  | 2  | 4  | 6  | 8  | 10 | 12 | 14 | 16 |
| 18 | 19 | 21 | 23 | 25 | 27 | 29 | 31 | 1  | 3  | 5  | 7  | 9  | 11 | 13 | 15 | 17 |
| 19 | 20 | 22 | 24 | 26 | 28 | 30 | 0  | 2  | 4  | 6  | 8  | 10 | 12 | 14 | 16 | 18 |
| 20 | 21 | 23 | 25 | 27 | 29 | 31 | 1  | 3  | 5  | 7  | 9  | 11 | 13 | 15 | 17 | 19 |
| 21 | 22 | 24 | 26 | 28 | 30 | 0  | 2  | 4  | 6  | 8  | 10 | 12 | 14 | 16 | 18 | 20 |
| 22 | 23 | 25 | 27 | 29 | 31 | 1  | 3  | 5  | 7  | 9  | 11 | 13 | 15 | 17 | 19 | 21 |
| 23 | 24 | 26 | 28 | 30 | 0  | 2  | 4  | 6  | 8  | 10 | 12 | 14 | 16 | 18 | 20 | 22 |
| 24 | 25 | 27 | 29 | 31 | 1  | 3  | 5  | 7  | 9  | 11 | 13 | 15 | 17 | 19 | 21 | 23 |
| 25 | 26 | 28 | 30 | 0  | 2  | 4  | 6  | 8  | 10 | 12 | 14 | 16 | 18 | 20 | 22 | 24 |
| 26 | 27 | 29 | 31 | 1  | 3  | 5  | 7  | 9  | 11 | 13 | 15 | 17 | 19 | 21 | 23 | 25 |
| 27 | 28 | 30 | 0  | 2  | 4  | 6  | 8  | 10 | 12 | 14 | 16 | 18 | 20 | 22 | 24 | 26 |
| 28 | 29 | 31 | 1  | 3  | 5  | 7  | 9  | 11 | 13 | 15 | 17 | 19 | 21 | 23 | 25 | 27 |
| 29 | 30 | 0  | 2  | 4  | 6  | 8  | 10 | 12 | 14 | 16 | 18 | 20 | 22 | 24 | 26 | 28 |
| 30 | 31 | 1  | 3  | 5  | 7  | 9  | 11 | 13 | 15 | 17 | 19 | 21 | 23 | 25 | 27 | 29 |
| 31 | 0  | 2  | 4  | 6  | 8  | 10 | 12 | 14 | 16 | 18 | 20 | 22 | 24 | 26 | 28 | 30 | wherein the output signal determination table takes the following form:

| Output Phase Index | Component Modulation Output Signal |
|---|---|
| 0 | 0 |
| 1 | $\sin \pi/16$ |
| 2 | $\sin \pi/8$ |
| 3 | $\sin 3\pi/16$ |

-continued

| Output Phase Index | Component Modulation Output Signal |
|---|---|
| 4 | 1/√2 |
| 5 | sin 5π/16 |
| 6 | sin 3π/8 |
| 7 | sin 7π/16 |
| 8 | 1 |
| 9 | sin 9π/16 |
| 10 | sin 5π/8 |
| 11 | sin 11π/16 |
| 12 | 1/√2 |
| 13 | sin 13π/16 |
| 14 | sin 7π/8 |
| 15 | sin 15π/16 |
| 16 | 0 |
| 17 | sin 17π/16 |
| 18 | sin 9π/8 |
| 19 | sin 19π/16 |
| 20 | −1/√2 |
| 21 | sin 21π/16 |
| 22 | sin 11π/8 |
| 23 | sin 23π/16 |
| 24 | −1 |
| 25 | sin 25π/16 |
| 26 | sin 13π/8 |
| 27 | sin 27π/16 |
| 28 | −1/√2 |
| 29 | sin 29π/16 |
| 30 | sin 15π/8 |
| 31 | sin 31π/16. |

2. A method for generating π/16-shifted 16-differential encoded phase shift keying modulation signals in a digital transfer system including an output signal determination table stored with quadrature-phase component modulation signals respectively assigned with current output phase indexes, comprising the steps of:

(a) converting a serial binary data stream of 4 bits into parallel binary data streams;

(b) determining a current phase variation index, in a current time interval, associated with the parallel binary data streams from the table below

| Bit 1 | Bit 2 | Bit 3 | Bit 4 | Current Phase Variation Index |
|---|---|---|---|---|
| 0 | 0 | 0 | 0 | 1 |
| 0 | 0 | 0 | 1 | 3 |
| 0 | 0 | 1 | 0 | 5 |
| 0 | 0 | 1 | 1 | 7 |
| 0 | 1 | 0 | 0 | 9 |
| 0 | 1 | 0 | 1 | 11 |
| 0 | 1 | 1 | 0 | 13 |
| 0 | 1 | 1 | 1 | 15 |
| 1 | 0 | 0 | 0 | 17 |
| 1 | 0 | 0 | 1 | 19 |
| 1 | 0 | 1 | 0 | 21 |
| 1 | 0 | 1 | 1 | 23 |
| 1 | 1 | 0 | 0 | 25 |
| 1 | 1 | 0 | 1 | 27 |
| 1 | 1 | 1 | 0 | 29 |
| 1 | 1 | 1 | 1 | 31 |

(c) performing modulo 32 addition of the determined current phase variation index determined in the current time interval to a previous output phase index determined in a previous time interval, thereby determining a current output phase index, and setting the determined current output phase index as a previous output phase index to be used in a next time interval;

(d) determining a quadrature-phase component modulation output signal corresponding to the current output phase index, by reading a component modulation signal corresponding to the determined current output phase value index from the output signal determination table; and (e) incrementing the current output phase index determined in step (c) by 8 using modulo 32 addition, determining an in-phase component modulation output signal corresponding to the incremented current output phase index by reading the output signal determination table;

wherein the output signal determination table takes the following form:

| Output Phase Index | Component Modulation Output Signal |
|---|---|
| 0 | 0 |
| 1 | sin π/16 |
| 2 | sin π/8 |
| 3 | sin 3π/16 |
| 4 | 1/√2 |
| 5 | sin 5π/16 |
| 6 | sin 3π/8 |
| 7 | sin 7π/16 |
| 8 | 1 |
| 9 | sin 9π/16 |
| 10 | sin 5π/8 |
| 11 | sin 11π/16 |
| 12 | 1/√2 |
| 13 | sin 13π/16 |
| 14 | sin 7π/8 |
| 15 | sin 15π/16 |
| 16 | 0 |
| 17 | sin 17π/16 |
| 18 | sin 9π/8 |
| 19 | sin 19π/16 |
| 20 | −1/√2 |
| 21 | sin 21π/16 |
| 22 | sin 11π/8 |
| 23 | sin 23π/16 |
| 24 | −1 |
| 25 | sin 25π/16 |
| 26 | sin 13π/8 |
| 27 | sin 27π/16 |
| 28 | −1/√2 |
| 29 | sin 29π/16 |
| 30 | sin 15π/8 |
| 31 | sin 31π/16. |

3. An apparatus for generating π/16-shifted 16-differential encoded phase shift keying modulation signals, comprising:

a serial-to-parallel converter for converting a serial binary data stream into four parallel binary data streams, wherein each combination of parallel binary data streams output from the serial-to-parallel converter corresponds to a phase variation index;

an output phase index determining unit including an output phase index determination table having columns indexed by a current phase variation index and rows indexed by a past output phase index, said output phase index determining unit determining a current output phase index by finding the intersection on the output phase index determination table of the current phase variation index and the past output phase index, said output phase index determining unit further storing the current output phase index to be used as the past output phase index in the next time interval; and an output signal determining unit including an output signal determination table having each component modulation output signal associated with an output phase index, said output signal determining unit looking up the current output phase index in the output signal determination table to determine a current in-phase component modulation output signal, said output signal determining unit further subtracting 8 in modulo 32 arithmetic from the current output phase index to determine a current quadrature-phase component modulation output signal by looking up the subtracted output phase index in the output signal determination table;

wherein the combinations of parallel binary data streams output from the serial-to-parallel converter corresponds to phase variation indexes in the following manner:

| Bit 1 | Bit 2 | Bit 3 | Bit 4 | Phase Variation Index |
|---|---|---|---|---|
| 0 | 0 | 0 | 0 | 1 |
| 0 | 0 | 0 | 1 | 3 |
| 0 | 0 | 1 | 0 | 5 |
| 0 | 0 | 1 | 1 | 7 |
| 0 | 1 | 0 | 0 | 9 |
| 0 | 1 | 0 | 1 | 11 |
| 0 | 1 | 1 | 0 | 13 |
| 0 | 1 | 1 | 1 | 15 |
| 1 | 0 | 0 | 0 | 17 |
| 1 | 0 | 0 | 1 | 19 |
| 1 | 0 | 1 | 0 | 21 |
| 1 | 0 | 1 | 1 | 23 |
| 1 | 1 | 0 | 0 | 25 |
| 1 | 1 | 0 | 1 | 27 |
| 1 | 1 | 1 | 0 | 29 |
| 1 | 1 | 1 | 1 | 31 | wherein the output phase index determination table takes the following form:

|  | 1 | 3 | 5 | 7 | 9 | 11 | 13 | 15 | 17 | 19 | 21 | 23 | 25 | 27 | 29 | 31 |
|---|---|---|---|---|---|---|---|---|---|---|---|---|---|---|---|---|
| 0 | 1 | 3 | 5 | 7 | 9 | 11 | 13 | 15 | 17 | 19 | 21 | 23 | 25 | 27 | 29 | 31 |
| 1 | 2 | 4 | 6 | 8 | 10 | 12 | 14 | 16 | 18 | 20 | 22 | 24 | 26 | 28 | 30 | 0 |
| 2 | 3 | 5 | 7 | 9 | 11 | 13 | 15 | 17 | 19 | 21 | 23 | 25 | 27 | 29 | 31 | 1 |
| 3 | 4 | 6 | 8 | 10 | 12 | 14 | 16 | 18 | 20 | 22 | 24 | 26 | 28 | 30 | 0 | 2 |
| 4 | 5 | 7 | 9 | 11 | 13 | 15 | 17 | 19 | 21 | 23 | 25 | 27 | 29 | 31 | 1 | 3 |
| 5 | 6 | 8 | 10 | 12 | 14 | 16 | 18 | 20 | 22 | 24 | 26 | 28 | 30 | 0 | 2 | 4 |
| 6 | 7 | 9 | 11 | 13 | 15 | 17 | 19 | 21 | 23 | 25 | 21 | 29 | 31 | 1 | 3 | 5 |
| 7 | 8 | 10 | 12 | 14 | 16 | 18 | 20 | 22 | 24 | 26 | 28 | 30 | 0 | 2 | 4 | 6 |
| 8 | 9 | 11 | 13 | 15 | 17 | 19 | 21 | 23 | 25 | 27 | 29 | 31 | 1 | 3 | 5 | 7 |
| 9 | 10 | 12 | 14 | 16 | 18 | 20 | 22 | 24 | 26 | 28 | 30 | 0 | 2 | 4 | 6 | 8 |
| 10 | 11 | 13 | 15 | 17 | 19 | 21 | 23 | 25 | 27 | 29 | 31 | 1 | 3 | 5 | 7 | 9 |
| 11 | 12 | 14 | 16 | 18 | 20 | 22 | 24 | 26 | 28 | 30 | 0 | 2 | 4 | 6 | 8 | 10 |
| 12 | 13 | 15 | 17 | 19 | 21 | 23 | 25 | 27 | 29 | 31 | 1 | 3 | 5 | 7 | 9 | 11 |
| 13 | 14 | 16 | 18 | 20 | 22 | 24 | 26 | 28 | 30 | 0 | 2 | 4 | 6 | 8 | 10 | 12 |
| 14 | 15 | 17 | 19 | 21 | 23 | 25 | 27 | 29 | 31 | 1 | 3 | 5 | 7 | 9 | 11 | 13 |
| 15 | 16 | 18 | 20 | 22 | 24 | 26 | 28 | 30 | 0 | 2 | 4 | 6 | 8 | 10 | 12 | 14 |
| 16 | 17 | 19 | 21 | 23 | 25 | 27 | 29 | 31 | 1 | 3 | 5 | 7 | 9 | 11 | 13 | 15 |
| 17 | 18 | 20 | 22 | 24 | 26 | 28 | 30 | 0 | 2 | 4 | 6 | 8 | 10 | 12 | 14 | 16 |
| 18 | 19 | 21 | 23 | 25 | 27 | 29 | 31 | 1 | 3 | 5 | 7 | 9 | 11 | 13 | 15 | 17 |
| 19 | 20 | 22 | 24 | 26 | 28 | 30 | 0 | 2 | 4 | 6 | 8 | 10 | 12 | 14 | 16 | 18 |
| 20 | 21 | 23 | 25 | 27 | 29 | 31 | 1 | 3 | 5 | 7 | 9 | 11 | 13 | 15 | 17 | 19 |
| 21 | 22 | 24 | 26 | 28 | 30 | 0 | 2 | 4 | 6 | 8 | 10 | 12 | 14 | 16 | 18 | 20 |
| 22 | 23 | 25 | 27 | 29 | 31 | 1 | 3 | 5 | 7 | 9 | 11 | 13 | 15 | 17 | 19 | 21 |
| 23 | 24 | 26 | 28 | 30 | 0 | 2 | 4 | 6 | 8 | 10 | 12 | 14 | 16 | 18 | 20 | 22 |
| 24 | 25 | 27 | 29 | 31 | 1 | 3 | 5 | 7 | 9 | 11 | 13 | 15 | 17 | 19 | 21 | 23 |
| 25 | 26 | 28 | 30 | 0 | 2 | 4 | 6 | 8 | 10 | 12 | 14 | 16 | 18 | 20 | 22 | 24 |
| 26 | 27 | 29 | 31 | 1 | 3 | 5 | 7 | 9 | 11 | 13 | 15 | 17 | 19 | 21 | 23 | 25 |
| 27 | 28 | 30 | 0 | 2 | 4 | 6 | 8 | 10 | 12 | 14 | 16 | 18 | 20 | 22 | 24 | 26 |
| 28 | 29 | 31 | 1 | 3 | 5 | 7 | 9 | 11 | 13 | 15 | 17 | 19 | 21 | 23 | 25 | 27 |
| 29 | 30 | 0 | 2 | 4 | 6 | 8 | 10 | 12 | 14 | 16 | 18 | 20 | 22 | 24 | 26 | 28 |
| 30 | 31 | 1 | 3 | 5 | 7 | 9 | 11 | 13 | 15 | 17 | 19 | 21 | 23 | 25 | 27 | 29 |
| 31 | 0 | 2 | 4 | 6 | 8 | 10 | 12 | 14 | 16 | 18 | 20 | 22 | 24 | 26 | 28 | 30 | wherein the output signal determination table takes the following form:

| Output Phase Index | Component Modulation Output Signal |
|---|---|
| 0 | 1 |
| 1 | $\cos \pi/16$ |
| 2 | $\cos \pi/8$ |
| 3 | $\cos 3\pi/16$ |
| 4 | $1/\sqrt{2}$ |
| 5 | $\cos 5\pi/16$ |
| 6 | $\cos 3\pi/8$ |
| 7 | $\cos 7\pi/16$ |
| 8 | 0 |
| 9 | $\cos 9\pi/16$ |
| 10 | $\cos 5\pi/8$ |
| 11 | $\cos 11\pi/16$ |
| 12 | $-1/\sqrt{2}$ |
| 13 | $\cos 13\pi/16$ |
| 14 | $\cos 7\pi/8$ |
| 15 | $\cos 15\pi/16$ |
| 16 | $-1$ |
| 17 | $\cos 17\pi/16$ |
| 18 | $\cos 9\pi/8$ |
| 19 | $\cos 19\pi/16$ |
| 20 | $-1/\sqrt{2}$ |
| 21 | $\cos 21\pi/16$ |
| 22 | $\cos 11\pi/8$ |
| 23 | $\cos 23\pi/16$ |
| 24 | 0 |
| 25 | $\cos 25\pi/16$ |
| 26 | $\cos 13\pi/8$ |
| 27 | $\cos 27\pi/16$ |
| 28 | $1/\sqrt{2}$ |
| 29 | $\cos 29\pi/16$ |

-continued

| Output Phase Index | Component Modulation Output Signal |
|---|---|
| 30 | cos 15π/8 |
| 31 | cos 31π/16 |

4. A method for generating π/16-shifted 16-differential encoded phase shift keying modulation signals in a digital transfer system including an output signal determination table stored with in-phase component modulation signals respectively assigned with current output phase indexes, comprising the steps of:

(a) converting a serial binary data stream of 4 bits into parallel binary data streams;

(b) determining a current phase variation index, in a current time interval, associated with the parallel binary data streams from the table below:

| Bit 1 | Bit 2 | Bit 3 | Bit 4 | Current Phase Variation Index |
|---|---|---|---|---|
| 0 | 0 | 0 | 0 | 1 |
| 0 | 0 | 0 | 1 | 3 |
| 0 | 0 | 1 | 0 | 5 |
| 0 | 0 | 1 | 1 | 7 |
| 0 | 1 | 0 | 0 | 9 |
| 0 | 1 | 0 | 1 | 11 |
| 0 | 1 | 1 | 0 | 13 |
| 0 | 1 | 1 | 1 | 15 |
| 1 | 0 | 0 | 0 | 17 |
| 1 | 0 | 0 | 1 | 19 |
| 1 | 0 | 1 | 0 | 21 |
| 1 | 0 | 1 | 1 | 23 |
| 1 | 1 | 0 | 0 | 25 |
| 1 | 1 | 0 | 1 | 27 |
| 1 | 1 | 1 | 0 | 29 |
| 1 | 1 | 1 | 1 | 31 |

(c) performing modulo 32 addition of the determined current phase variation index determined in the current time interval to a previous output phase index determined in a previous time interval, thereby determining a current output phase index, and setting the determined current output phase index as the previous output phase index to be used in a next time interval;

(d) determining an in-phase component modulation output signal corresponding to the current output phase index, by reading a component modulation output signal corresponding to the determined current output phase index from the output signal determination table; and (e) decrementing the current output phase index determined in step (c) by 8 using modulo 32 subtraction, determining a quadrature-phase component modulation signal corresponding to the decremented current output phase index by reading the output signal determination table;

wherein the output signal determination table takes the following form:

| Output Phase Index | Component Modulation Output Signal |
|---|---|
| 0 | 1 |
| 1 | cos π/16 |
| 2 | cos π/8 |
| 3 | cos 3π/16 |
| 4 | 1/√2 |
| 5 | cos 5π/16 |
| 6 | cos 3π/8 |
| 7 | cos 7π/16 |
| 8 | 0 |
| 9 | cos 9π/16 |
| 10 | cos 5π/8 |
| 11 | cos 11π/16 |
| 12 | −1/√2 |
| 13 | cos 13π/16 |
| 14 | cos 7π/8 |
| 15 | cos 15π/16 |
| 16 | −1 |
| 17 | cos 17π/16 |
| 18 | cos 9π/8 |
| 19 | cos 19π/16 |
| 20 | −1/√2 |
| 21 | cos 21π/16 |
| 22 | cos 11π/8 |
| 23 | cos 23π/16 |
| 24 | 0 |
| 25 | cos 25π/16 |
| 26 | cos 13π/8 |
| 27 | cos 27π/16 |
| 28 | 1/√2 |
| 29 | cos 29π/16 |
| 30 | cos 15π/8 |
| 31 | cos 31π/16 |

5. An apparatus for generating π/16-shifted 16-differential encoded phase shift keying modulation signals, comprising:

a serial-to-parallel converter for converting a serial binary data stream into parallel binary data streams, wherein each combination of parallel binary data streams output from the serial-to-parallel converter corresponds to a phase variation index;

an output phase index determining unit including an output phase index determination table having columns indexed by a current phase variation index and rows indexed by a past output phase index, said output phase index determining unit determining a current output phase index by finding the intersection on the output phase index determination table of the current phase variation index and the past output phase index, said output phase index determining unit further storing the current output phase index to be used as the past output phase index in the next time interval; and an output signal determining unit including an output signal determination table having output phase indexes, each output phase index being associated with an in-phase component modulation output signal and a quadrature-phase component modulation output signal, said output signal determining unit looking up the current output phase index in the output signal determination table to determine both a current in-phase component modulation output signal and a current quadrature-phase component modulation output signal;

wherein the combinations of parallel binary data streams output from the serial-to-parallel converter corresponds to phase variation indexes in the following manner:

| Bit 1 | Bit 2 | Bit 3 | Bit 4 | Phase Variation Index |
|---|---|---|---|---|
| 0 | 0 | 0 | 0 | 1 |
| 0 | 0 | 0 | 1 | 3 |
| 0 | 0 | 1 | 0 | 5 |
| 0 | 0 | 1 | 1 | 7 |
| 0 | 1 | 0 | 0 | 9 |
| 0 | 1 | 0 | 1 | 11 |
| 0 | 1 | 1 | 0 | 13 |
| 0 | 1 | 1 | 1 | 15 |
| 1 | 0 | 0 | 0 | 17 |
| 1 | 0 | 0 | 1 | 19 |
| 1 | 0 | 1 | 0 | 21 |
| 1 | 0 | 1 | 1 | 23 |
| 1 | 1 | 0 | 0 | 25 |
| 1 | 1 | 0 | 1 | 27 |
| 1 | 1 | 1 | 0 | 29 |
| 1 | 1 | 1 | 1 | 31 | wherein the output phase index determination table takes the following form:

|    | 1 | 3 | 5 | 7 | 9 | 11 | 13 | 15 | 17 | 19 | 21 | 23 | 25 | 27 | 29 | 31 |
|---|---|---|---|---|---|---|---|---|---|---|---|---|---|---|---|---|
| 0 | 1 | 3 | 5 | 7 | 9 | 11 | 13 | 15 | 17 | 19 | 21 | 23 | 25 | 27 | 29 | 31 |
| 1 | 2 | 4 | 6 | 8 | 10 | 12 | 14 | 16 | 18 | 20 | 22 | 24 | 26 | 28 | 30 | 0 |
| 2 | 3 | 5 | 7 | 9 | 11 | 13 | 15 | 17 | 19 | 21 | 23 | 25 | 27 | 29 | 31 | 1 |
| 3 | 4 | 6 | 8 | 10 | 12 | 14 | 16 | 18 | 20 | 22 | 24 | 26 | 28 | 30 | 0 | 2 |
| 4 | 5 | 7 | 9 | 11 | 13 | 15 | 17 | 19 | 21 | 23 | 25 | 27 | 29 | 31 | 1 | 3 |
| 5 | 6 | 8 | 10 | 12 | 14 | 16 | 18 | 20 | 22 | 24 | 26 | 28 | 30 | 0 | 2 | 4 |
| 6 | 7 | 9 | 11 | 13 | 15 | 17 | 19 | 21 | 23 | 25 | 21 | 29 | 31 | 1 | 3 | 5 |
| 7 | 8 | 10 | 12 | 14 | 16 | 18 | 20 | 22 | 24 | 26 | 28 | 30 | 0 | 2 | 4 | 6 |
| 8 | 9 | 11 | 13 | 15 | 17 | 19 | 21 | 23 | 25 | 27 | 29 | 31 | 1 | 3 | 5 | 7 |
| 9 | 10 | 12 | 14 | 16 | 18 | 20 | 22 | 24 | 26 | 28 | 30 | 0 | 2 | 4 | 6 | 8 |
| 10 | 11 | 13 | 15 | 17 | 19 | 21 | 23 | 25 | 27 | 29 | 31 | 1 | 3 | 5 | 7 | 9 |
| 11 | 12 | 14 | 16 | 18 | 20 | 22 | 24 | 26 | 28 | 30 | 0 | 2 | 4 | 6 | 8 | 10 |
| 12 | 13 | 15 | 17 | 19 | 21 | 23 | 25 | 27 | 29 | 31 | 1 | 3 | 5 | 7 | 9 | 11 |
| 13 | 14 | 16 | 18 | 20 | 22 | 24 | 26 | 28 | 30 | 0 | 2 | 4 | 6 | 8 | 10 | 12 |
| 14 | 15 | 17 | 19 | 21 | 23 | 25 | 27 | 29 | 31 | 1 | 3 | 5 | 7 | 9 | 11 | 13 |
| 15 | 16 | 18 | 20 | 22 | 24 | 26 | 28 | 30 | 0 | 2 | 4 | 6 | 8 | 10 | 12 | 14 |
| 16 | 17 | 19 | 21 | 23 | 25 | 27 | 29 | 31 | 1 | 3 | 5 | 7 | 9 | 11 | 13 | 15 |
| 17 | 18 | 20 | 22 | 24 | 26 | 28 | 30 | 0 | 2 | 4 | 6 | 8 | 10 | 12 | 14 | 16 |
| 18 | 19 | 21 | 23 | 25 | 27 | 29 | 31 | 1 | 3 | 5 | 7 | 9 | 11 | 13 | 15 | 17 |
| 19 | 20 | 22 | 24 | 26 | 28 | 30 | 0 | 2 | 4 | 6 | 8 | 10 | 12 | 14 | 16 | 18 |
| 20 | 21 | 23 | 25 | 27 | 29 | 31 | 1 | 3 | 5 | 7 | 9 | 11 | 13 | 15 | 17 | 19 |
| 21 | 22 | 24 | 26 | 28 | 30 | 0 | 2 | 4 | 6 | 8 | 10 | 12 | 14 | 16 | 18 | 20 |
| 22 | 23 | 25 | 27 | 29 | 31 | 1 | 3 | 5 | 7 | 9 | 11 | 13 | 15 | 17 | 19 | 21 |
| 23 | 24 | 26 | 28 | 30 | 0 | 2 | 4 | 6 | 8 | 10 | 12 | 14 | 16 | 18 | 20 | 22 |
| 24 | 25 | 27 | 29 | 31 | 1 | 3 | 5 | 7 | 9 | 11 | 13 | 15 | 17 | 19 | 21 | 23 |
| 25 | 26 | 28 | 30 | 0 | 2 | 4 | 6 | 8 | 10 | 12 | 14 | 16 | 18 | 20 | 22 | 24 |
| 26 | 27 | 29 | 31 | 1 | 3 | 5 | 7 | 9 | 11 | 13 | 15 | 17 | 19 | 21 | 23 | 25 |
| 27 | 28 | 30 | 0 | 2 | 4 | 6 | 8 | 10 | 12 | 14 | 16 | 18 | 20 | 22 | 24 | 26 |
| 28 | 29 | 31 | 1 | 3 | 5 | 7 | 9 | 11 | 13 | 15 | 17 | 19 | 21 | 23 | 25 | 27 |
| 29 | 30 | 0 | 2 | 4 | 6 | 8 | 10 | 12 | 14 | 16 | 18 | 20 | 22 | 24 | 26 | 28 |
| 30 | 31 | 1 | 3 | 5 | 7 | 9 | 11 | 13 | 15 | 17 | 19 | 21 | 23 | 25 | 27 | 29 |
| 31 | 0 | 2 | 4 | 6 | 8 | 10 | 12 | 14 | 16 | 18 | 20 | 22 | 24 | 26 | 28 | 30 | wherein the output signal determination table takes the following form:

| Current Output Phase Index | Quadrature-Phase Component Modulation Output Signal | In-Phase Component Modulation Output Signal |
|---|---|---|
| 0 | 0 | 1 |
| 1 | $\sin \pi/16$ | $\cos \pi/16$ |
| 2 | $\sin \pi/8$ | $\cos \pi/8$ |
| 3 | $\sin 3\pi/16$ | $\cos 3\pi/16$ |
| 4 | $1/\sqrt{2}$ | $1/\sqrt{2}$ |
| 5 | $\sin 5\pi/16$ | $\cos 5\pi/16$ |
| 6 | $\sin 3\pi/8$ | $\cos 3\pi/8$ |
| 7 | $\sin 7\pi/16$ | $\cos 7\pi/16$ |
| 8 | 1 | 0 |
| 9 | $\sin 9\pi/16$ | $\cos 9\pi/16$ |
| 10 | $\sin 5\pi/8$ | $\cos 5\pi/8$ |
| 11 | $\sin 11\pi/16$ | $\cos 11\pi/16$ |
| 12 | $1/\sqrt{2}$ | $-1/\sqrt{2}$ |
| 13 | $\sin 13\pi/16$ | $\cos 13\pi/16$ |
| 14 | $\sin 7\pi/8$ | $\cos 7\pi/8$ |
| 15 | $\sin 15\pi/16$ | $\cos 15\pi/16$ |
| 16 | 0 | $-1$ |
| 17 | $\sin 17\pi/16$ | $\cos 17\pi/16$ |
| 18 | $\sin 9\pi/8$ | $\cos 9\pi/8$ |
| 19 | $\sin 19\pi/16$ | $\cos 19\pi/16$ |
| 20 | $-1/\sqrt{2}$ | $-1/\sqrt{2}$ |
| 21 | $\sin 21\pi/16$ | $\cos 21\pi/16$ |
| 22 | $\sin 11\pi/8$ | $\cos 11\pi/8$ |
| 23 | $\sin 23\pi/16$ | $\cos 23\pi/16$ |
| 24 | $-1$ | 0 |
| 25 | $\sin 25\pi/16$ | $\cos 25\pi/16$ |
| 26 | $\sin 13\pi/8$ | $\cos 13\pi/8$ |
| 27 | $\sin 27\pi/16$ | $\cos 27\pi/16$ |
| 28 | $-1/\sqrt{2}$ | $1/\sqrt{2}$ |
| 29 | $\sin 29\pi/16$ | $\cos 29\pi/16$ |

-continued

| Current Output Phase Index | Quadrature-Phase Component Modulation Output Signal | In-Phase Component Modulation Output Signal |
|---|---|---|
| 30 | sin 15π/8 | cos 15π/8 |
| 31 | sin 31π/16 | cos 31π/16 |

6. A method for generating π/16-shifted 16-differential encoded phase shift keying modulation signals in a digital transfer system including an output signal determination table stored with in-phase component modulation signals respectively assigned with current output phase indexes, comprising the steps of:

(a) converting a serial binary data stream of 4 bits into parallel binary data streams;

(b) determining a current phase variation index, in a current time interval, associated with the parallel binary data streams from the table below:

| Bit 1 | Bit 2 | Bit 3 | Bit 4 | Phase Variation Index |
|---|---|---|---|---|
| 0 | 0 | 0 | 0 | 1 |
| 0 | 0 | 0 | 1 | 3 |
| 0 | 0 | 1 | 0 | 5 |
| 0 | 0 | 1 | 1 | 7 |
| 0 | 1 | 0 | 0 | 9 |
| 0 | 1 | 0 | 1 | 11 |
| 0 | 1 | 1 | 0 | 13 |
| 0 | 1 | 1 | 1 | 15 |
| 1 | 0 | 0 | 0 | 17 |
| 1 | 0 | 0 | 1 | 19 |
| 1 | 0 | 1 | 0 | 21 |
| 1 | 0 | 1 | 1 | 23 |
| 1 | 1 | 0 | 0 | 25 |
| 1 | 1 | 0 | 1 | 27 |
| 1 | 1 | 1 | 0 | 29 |
| 1 | 1 | 1 | 1 | 31 |

(c) performing modulo 32 addition of the determined current phase variation index determined in the current time interval to a previous output phase index determined in a previous time interval, thereby determining a current output phase index, and setting the determined current output phase index as a previous output phase index to be used in a next time interval; and (d) determining an output signal corresponding to the current output phase index, by reading both an in-phase component modulation signal and a quadrature-phase component modulation signal corresponding to the determined current output phase index from the output signal determination table;

wherein the output signal determination table takes the following form:

| Current Output Phase Index | Quadrature-Phase Component Modulation Output Signal | In-Phase Component Modulation Output Signal |
|---|---|---|
| 0 | 0 | 1 |
| 1 | sin π/16 | cos π/16 |
| 2 | sin π/8 | cos π/8 |
| 3 | sin 3π/16 | cos 3π/16 |
| 4 | 1/√2 | 1/√2 |
| 5 | sin 5π/16 | cos 5π/16 |
| 6 | sin 3π/8 | cos 3π/8 |
| 7 | sin 7π/16 | cos 7π/16 |
| 8 | 1 | 0 |
| 9 | sin 9π/16 | cos 9π/16 |
| 10 | sin 5π/8 | cos 5π/8 |
| 11 | sin 11π/16 | cos 11π/16 |
| 12 | 1/√2 | -1/√2 |
| 13 | sin 13π/16 | cos 13π/16 |
| 14 | sin 7π/8 | cos 7π/8 |
| 15 | sin 15π/16 | cos 15π/16 |
| 16 | 0 | -1 |
| 17 | sin 17π/16 | cos 17π/16 |
| 18 | sin 9π/8 | cos 9π/8 |
| 19 | sin 19π/16 | cos 19π/16 |
| 20 | -1/√2 | -1/√2 |
| 21 | sin 21π/16 | cos 21π/16 |
| 22 | sin 11π/8 | cos 11π/8 |
| 23 | sin 23π/16 | cos 23π/16 |
| 24 | -1 | 0 |
| 25 | sin 25π/16 | cos 25π/16 |
| 26 | sin 13π/8 | cos 13π/8 |
| 27 | sin 27π/16 | cos 27π/16 |
| 28 | -1/√2 | 1/√2 |
| 29 | sin 29π/16 | cos 29π/16 |
| 30 | sin 15π/8 | cos 15π/8 |
| 31 | sin 31π/16 | cos 31π/16 |

* * * * *